US007017045B1

(12) United States Patent
Krishnamachari

(10) Patent No.: US 7,017,045 B1
(45) Date of Patent: Mar. 21, 2006

(54) MULTIMEDIA WATERMARKING SYSTEM AND METHOD

(75) Inventor: Santhana Krishnamachari, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 939 days.

(21) Appl. No.: 09/643,483

(22) Filed: Aug. 22, 2000

(51) Int. Cl.
*H04L 9/00* (2006.01)
(52) U.S. Cl. .......................... 713/176; 380/51; 380/54; 380/210; 382/100; 382/232
(58) Field of Classification Search ................ 713/176, 713/175, 179; 380/201, 229, 232, 51, 54, 380/210; 382/100, 232, 164, 237
See application file for complete search history.

(56) References Cited

U.S. PATENT DOCUMENTS

| 5,915,027 | A  | * | 6/1999  | Cox et al. ....................... 380/54 |
| 5,991,426 | A  | * | 11/1999 | Cox et al. ..................... 382/100 |
| 5,995,426 | A  | * | 11/1999 | Cowles et al. .............. 365/201 |
| 6,069,914 | A  | * | 5/2000  | Cox ............................ 375/150 |
| 6,351,538 | B1 | * | 2/2002  | Uz ............................. 380/201 |
| 6,363,159 | B1 | * | 3/2002  | Rhoads ........................ 382/100 |
| 6,434,253 | B1 | * | 8/2002  | Hayashi et al. ............. 382/100 |
| 6,611,607 | B1 | * | 8/2003  | Davis et al. ................. 382/100 |
| 6,636,615 | B1 | * | 10/2003 | Rhoads et al. .............. 382/100 |
| 6,714,683 | B1 | * | 3/2004  | Tian et al. ................... 382/240 |
| 6,785,815 | B1 | * | 8/2004  | Serret-Avila et al. ........ 713/176 |
| 6,804,356 | B1 | * | 10/2004 | Krishnamachari .......... 380/201 |
| 2003/0161496 | A1 | * | 8/2003 | Hayashi et al. ............. 382/100 |
| 2005/0050332 | A1 | * | 3/2005 | Serret-Avila et al. ........ 713/176 |

FOREIGN PATENT DOCUMENTS

WO    WO0004712    1/2000

OTHER PUBLICATIONS

Webster's Third New International Dictionary of the English Language Unabridged, 1966, G $C Merriam Co., p. 466.*
J. Dittmann et al, "Combined Video and Audio Watermarking: Embedding Content Information in Multimedia Data", Proceedings of the SPIE, SPIE, Bellingham, VA, US, vol. 3971, 2000, pp. 455-464, XP 000980610.

* cited by examiner

*Primary Examiner*—Kim Vu
*Assistant Examiner*—Beemnet W Dada

(57) ABSTRACT

A system and method for verifying and authenticating multimedia objects. Provided is a system for splitting a watermark into at least a first and second part, inserting the first part of the watermark into a first component of the multimedia object, and inserting the second part into a second component of the multimedia object, and outputting a watermarked multimedia object. The watermark may be provided by obtaining a signature of the original multimedia object. Also included are systems and methods for checking the validity and authenticity of a received watermarked multimedia object, wherein the multimedia object includes individual watermarked media components.

16 Claims, 4 Drawing Sheets

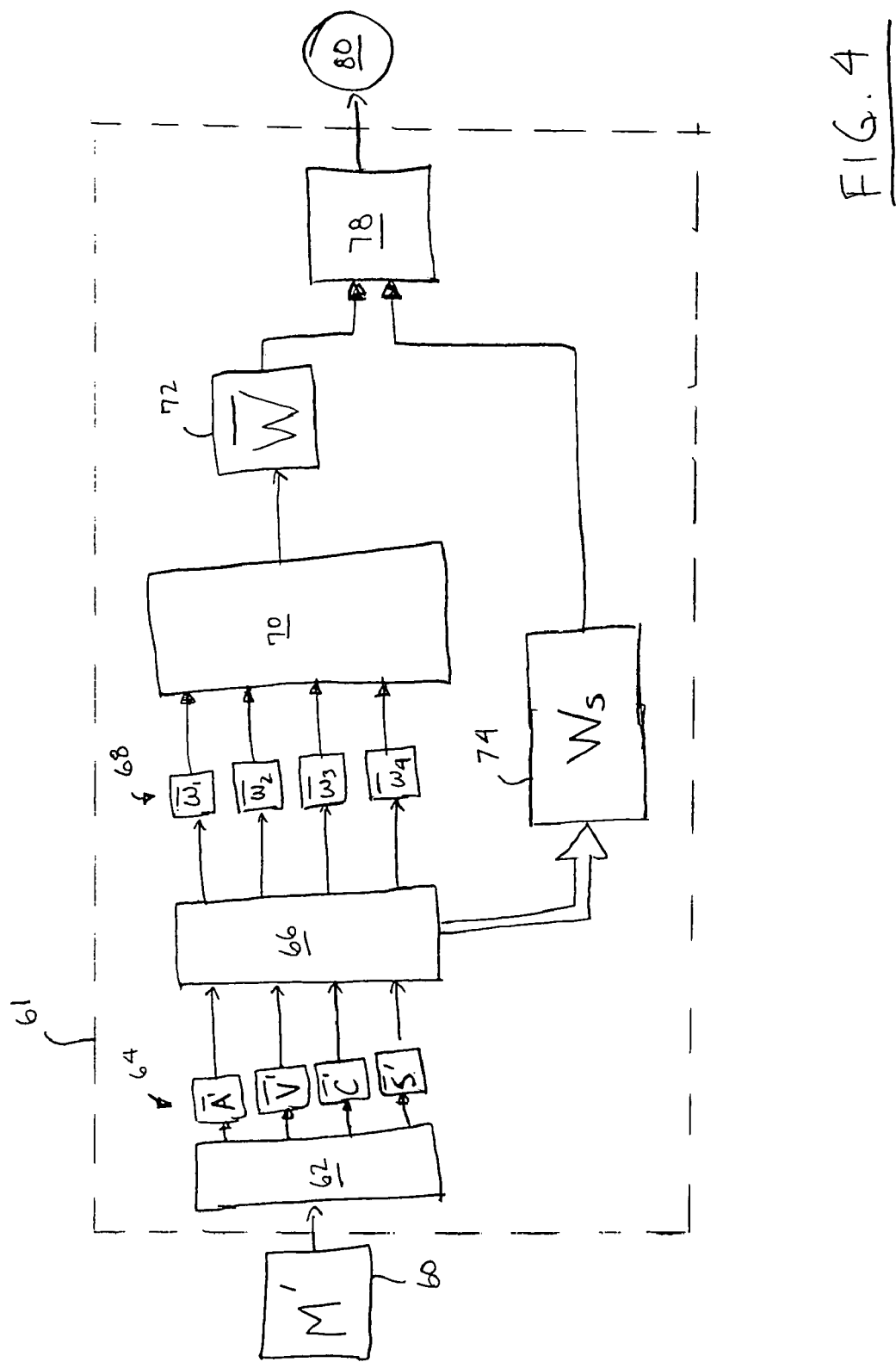

MULTIMEDIA WATERMARKING SYSTEM AND METHOD

BACKGROUND OF THE INVENTION

1. Technical Field

The present invention relates to verifying and authenticating multimedia objects, and more particularly to a system and method to combine watermarks in a plurality of multimedia components.

2. Related Art

Watermarking is the process of hiding or inserting data in multimedia objects, such as audio, video and still image content. An inserted watermark can be used for various purposes, including: (1) verification, i.e., to identify the rightful owner of the content and protect the copyrights therein; and (2) authentication, i.e., to ensure that the content has not been subjected to alteration.

In the case of watermarking for verification, the inserted watermark can be used to identify the owner of the content. Specifically, by inserting a watermark into the content, an owner can later prove ownership by extracting the watermark and showing that it matches the one originally inserted. In the case of watermarking for authentication, the inserted watermark can be used to verify the authenticity of the content by identifying content that has been tampered with. One way to achieve this is to provide a watermark that is dependent on the content. In this case, the watermark is typically a signature (or a function of the signature) of the content. This signature is chosen so that it reflects the salient characteristics of the content. Accordingly, if the content has been altered, the original watermark that reflects the original signature of the content will not match the new watermark, which reflects the signature of the tampered content.

Many different techniques for inserting watermarks in multimedia components are known. A typical watermark comprises data that can identify the owner (e.g., a visual logo) for verification; or data that captures the salient visual or auditory characteristics of the multimedia component for content authentication. In many cases, the watermark is inserted in the content without causing any perceivable change to the actual audio or video content. Thus, an end-user is generally not aware of the watermark.

A common problem, however, relates to ensuring that an inserted watermark has not been tampered with. For instance, consider the case of a watermarked video image. In a video image, successive frames tend to be almost identical due to the lack of motion between them. Such a lack of change between frames provides an opportunity for a hacker to identify or weaken the inserted watermark. For example, if a given frame is watermarked and the adjacent frame(s) are not watermarked, and are very similar to the watermarked frame, then the hacker can simply subtract the watermarked frame from the unwatermarked frame(s) to obtain the watermark. Identifying the watermark will enable the hacker to remove the watermark and even insert a different watermark to change the ownership rights. Even if the successive frames are watermarked (with different watermarks), the hacker can average the successive frames to weaken the watermark.

Accordingly, there exists a need to provide secure watermarking in multimedia objects, particularly those that include video. Without such a secure system, multimedia content will be subject to hackers who can easily defeat inserted watermarks.

SUMMARY OF THE INVENTION

This invention overcomes the above-mentioned problems, as well as others, by providing a technique to combine the watermarks in individual multimedia components, such as audio and video. In a first aspect, the invention includes a method of protecting a multimedia object having a first media component and a second media component, comprising the steps of: (1) providing a watermark; (2) splitting the watermark into a first part and a second part; (3) inserting the first part of the watermark into the first media component; (4) inserting the second part of the watermark into the second media component; and (5) outputting a watermarked multimedia object.

The watermarked multimedia object can be verified by: (1) receiving the watermarked multimedia object; (2) extracting from the first media component of the watermarked multimedia object a first extracted watermark part; (3) extracting from the second media component of the watermarked multimedia object a second extracted watermark part; (4) combining the first extracted watermark part with the second extracted watermark part; and (5) comparing the combined first and second extracted watermark parts with the provided watermark.

In a second aspect of the invention, a method is provided for protecting a multimedia object having a first media component and a second media component, comprising the steps of: (1) providing a watermark by obtaining a signature of the multimedia object, and generating the watermark as a function of the signature; (2) splitting the watermark into a first part and a second part; (3) inserting the first part of the watermark into the first media component; (4) inserting the second part of the watermark into the second media component; and (5) outputting a watermarked multimedia object.

Where the watermark is provided by obtaining a signature of the multimedia object, the watermarked multimedia object may be authenticated by: (1) receiving the watermarked multimedia object; (2) extracting from the first media component of the watermarked multimedia object a first extracted watermark part; (3) extracting from the second media component of the watermarked multimedia object a second extracted watermark part; (4) generating a combination watermark by combining the first extracted watermark part with the second extracted watermark part; (5) generating a signature watermark that is a function of a signature extracted from the watermarked multimedia object; and (6) comparing the combination watermark with the signature watermark.

In a further aspect, the invention includes a system for protecting a multimedia object having a first media component and a second media component, comprising: (1) a mechanism for splitting a watermark into a first and a second part; and (2) a mechanism for inserting the first part into the first media component, and for inserting the second part into the second media component. The system may further comprise a mechanism for obtaining a signature from the multimedia object, and a mechanism for generating the watermark as a function of the signature.

In a further aspect, the invention includes a system for verifying or authenticating a watermarked multimedia object having a first media component and a second media component, comprising: (1) a mechanism for extracting a first watermark part from the first media component, and for extracting a second watermark part from the second media component; (2) a mechanism for combining the first extracted watermark part with the second extracted watermark part; and (3) a mechanism for comparing the combined first and second watermark parts with a provided watermark.

BRIEF DESCRIPTION OF THE DRAWINGS

FIG. 4 describes a second embodiment of a verification mechanism which can verify the watermark of a watermarked object.

DETAILED DESCRIPTION OF THE DRAWINGS

Figure 1:
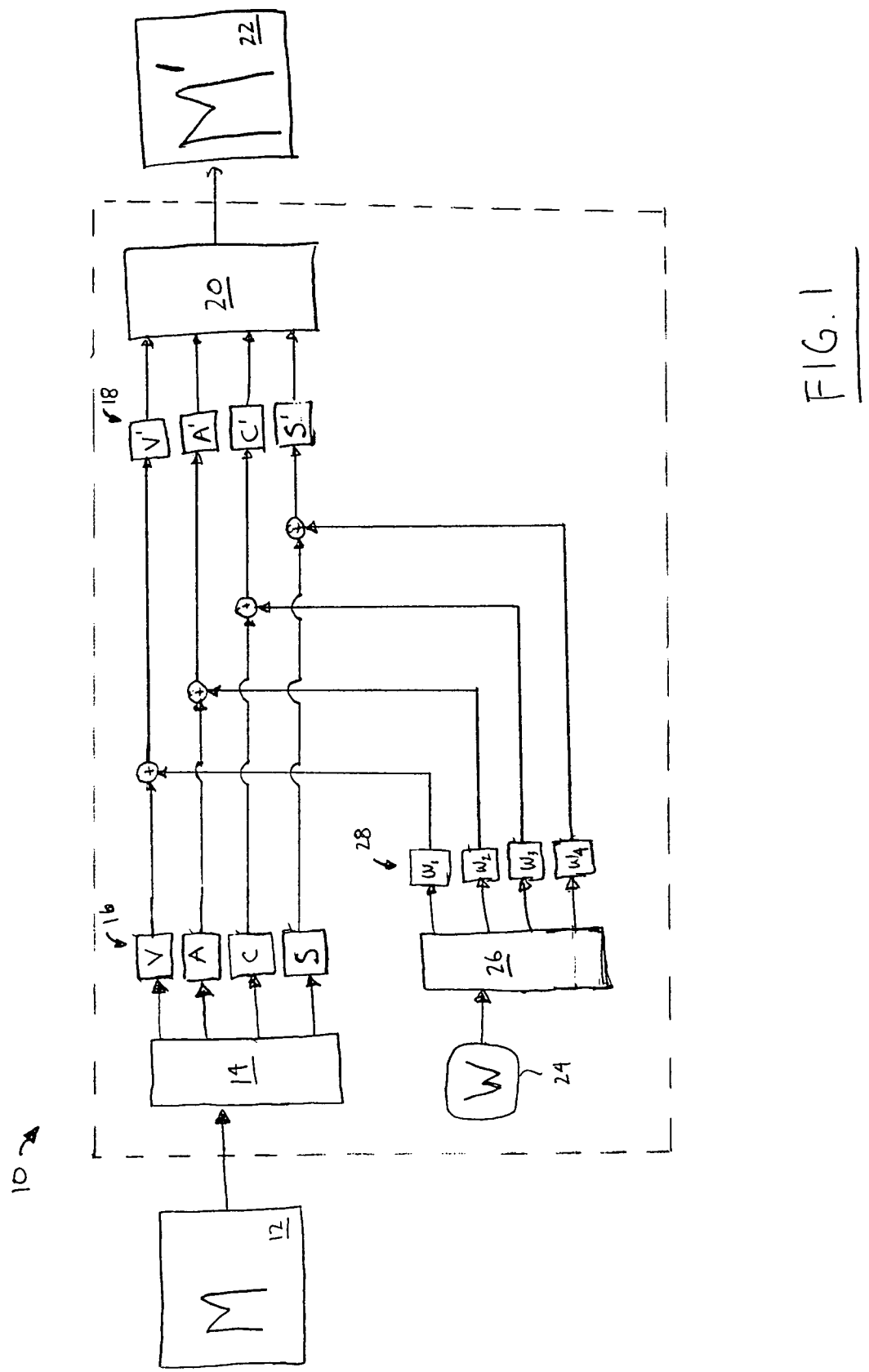
FIG. 1 describes a first embodiment of a system for watermarking a multimedia object in accordance with the invention.

The present invention provides a combined watermark system and method for multimedia objects. A "multimedia object," as described herein, may comprise one or more different types of media components of unlimited type, such as audio, video, fixed images, closed caption data, compressed data, email, etc. A multimedia object may exist in any form, including a data file, data signal, data stream, data object, data structure, transmission, or program. A multimedia object may exist in a digital format or analog format.

Overview

For the purposes of illustration, the following overview of the invention considers a multimedia object that comprises a video component and an audio component. However, it is understood that the invention is not limited to only audio-video applications. If V represents a video frame, A represents an audio frame, and w is a watermark, then independently watermarked content V' and A' could be obtained as follows:

$$V'=V+w, \text{ and } A'=A+w.$$

As discussed above, such a method provides an opportunity for watermark identification and tampering, since for example, subsequent frames of a video image may be analyzed to reveal the watermark w. In the present invention, the robustness of watermark w is greatly enhanced by splitting it into two parts, $w_1$ and $w_2$. The splitting is performed by any function F such that given the two parts $w_1$ and $w_2$, the original watermark w can be uniquely and exactly computed. The splitting and inserting of the watermarks into the audio and the video frames are accomplished as follows:

$$w=F(w_1, w_2), \quad (1)$$

$$V'=V+w_1, \text{ and } A'=A+w_2.$$

Since the watermark w is split into two parts and inserted into the audio and video frames, a potential hacker would have to decipher both parts of the watermark. Thus, even though successive video frames are often relatively unchanged, the corresponding audio is continuously and independently varying, thereby creating a more complex watermark that is much more difficult to decipher. In certain circumstances, the potential hacker would have to determine how the watermark parts $w_1$ and $w_2$ should be combined to arrive at the original watermark w.

As noted, the watermark w may be split into parts $w_1$ and $w_2$ in any manner desired (i.e., $w=F(w_1, w_2)$, where F could be any predetermined function.) For example, the watermark may be simply separated into two smaller parts, i.e., $w=w_1+w_2$. In such a case, since the amount of data that can be inserted into video is typically much larger than that which can be inserted into audio, the video watermark part may comprise a larger portion of the watermark data. Moreover, in order to make the system more robust, parts $w_1$ and $w_2$, could be split in a non-contiguous or non-additive manner, thereby making it more difficult for a hacker to identify the original watermark w. For instance, the system could utilize logical operations, such as OR, AND, XOR, or various combinations of these operations, to split and combine watermarks $w_1$ and $w_2$. In order to verify the watermark, the owner could extract the two watermark parts, and combine them using the predetermined function to create the original watermark.

In the case of authentication watermarking, the inserted watermark is dependent on the content to be protected. To achieve this, a signature that captures the salient characteristics of the content may be extracted from the multimedia object and then inserted into the content as a signature watermark. To test the authenticity of the content, the watermark extracted from the content is compared with the signature watermark. If the content is maliciously tampered, then the extracted watermark and the signature watermark would be different. As in the previous case, watermarking audio and video independently is not very robust and provides opportunities for a potential hacker to extract the watermark.

To achieve this robustness in applying an authentication watermark, combined audio-video watermarking is performed by first extracting a signature s that is dependent on both the audio and the video components. The function $f$ in the following equation extracts the salient characteristics of the audio and video. This signature is then split into two parts, as in the previous scenario and inserted into both the audio and video component.

$$s=f(V, A), s=F(w_1, w_2),$$

$$V'=V+w_1, \text{ and } A'=A+w_2.$$

In practical cases, the multimedia component might undergo some processing after the watermark is inserted. Some examples of these processes include image/video/audio compression, filtering, cropping, etc. It should be recognized that the watermark insertion procedure can be implemented such that the inserted watermark w can be extracted even if the content is subjected to these alterations. However, if the alterations are so drastic that they completely alter the visual (or auditory) content of the multimedia component, then it may not be possible to extract the watermark. Of course, when the multimedia component is altered so much that it does not resemble the original, the content owner may not be as concerned.

Exemplary Embodiments

Referring now to the figures, FIGS. 1–4 depict various systems for verifying and authenticating multimedia objects. The various devices, mechanisms and systems described therein may be realized in hardware, software, or a combination of hardware and software. They may be implemented by any type of computer system—or other apparatus adapted for carrying out the methods described herein. A typical combination of hardware and software could be a general purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

1. Watermark Verification

FIG. 1 depicts a system 10 for watermarking a multimedia object 12 to create a watermarked multimedia object 22. System 10 comprises a device 14 for separating the various media components 16 of multimedia object 12. Device 14 may comprise a de-multiplexer or any other hardware or software system for separating the individual media components 16. Media components 16 may comprise any number of different components. Shown in FIG. 1 are a video component V, audio component A, closed caption component C and miscellaneous signal components S. Components S represent any other media component(s) that may be included in multimedia object 12.

Also contained in system 10 is a predefined watermark 24. A watermark generally comprises some data that can be added to the multimedia object for authentication or verification purposes. Watermark 24 may, for example, comprise the logo of a company or a certificate that has been assigned to the content owner by a central authority (this is needed to ensure that two different content owners do not use the same watermark). Watermark 24 is divided into a plurality of watermark parts 28 by a splitting mechanism 26. Splitting mechanism 26 can split up the watermark 24 using any predetermined formula as previously described. For example, if the watermark contained n bits of data, a first part of the n bits could be inserted into a first watermark part $w_1$, the next part into $w_2$, the next part into $w_3$, and the final part into $w_4$. Watermark parts 28 are then independently added to the media components 16 to generate a set of watermarked media components 18. Watermarked media components 18 are then combined back together by system 20 to generate a watermarked multimedia object 22. Device 20 may comprise a multiplexer or any other hardware or software system for combining the media components into watermarked multimedia object 22. The resulting watermarked multimedia object 22 contains independently watermarked media components.

Figure 2:
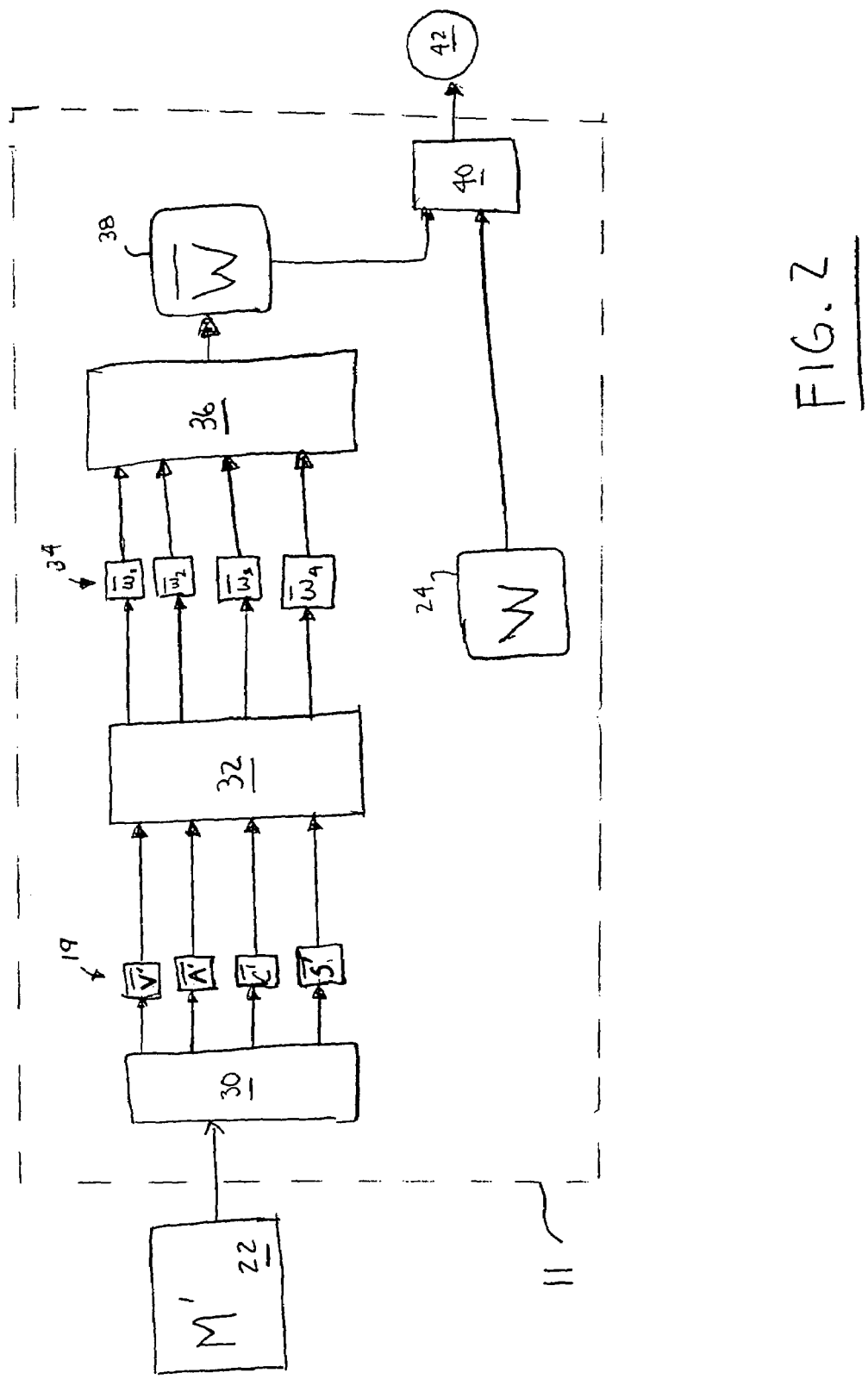
FIG. 2 describes a first embodiment of a verification mechanism which can verify the watermark of a watermarked object.

Referring now to FIG. 2, a verification mechanism 11 is shown that can verify the watermark in the watermarked multimedia object 22 created by the system of FIG. 1. Verification mechanism 11 first divides watermarked multimedia object 22 into a set of watermarked media components 19 using device 30. Similar to device 14 shown in FIG. 1, device 30 may comprise a de-multiplexer or any other hardware or software system for breaking the watermarked multimedia object 22 into individual watermarked media components 19. The watermarked media components 19 are then inputted into a watermark extraction mechanism 32 that extracts the watermarked parts 34 from each of the watermarked media components 19. Watermarked parts 34 are then combined together using combining mechanism 36 to generate an extracted watermark 38. Combining mechanism 36 combines the watermark parts 34 based on the same formula that splitting mechanism 26 shown in FIG. 1 used to split the original watermark. The extracted watermark 38 is then compared with the original watermark 24 by comparator 40. The results of the compare operation are then generated as output 42. If the watermarks match within a certain threshold, then it establishes that the multimedia component belongs to the content owner whose watermark appeared in the content.

2. Multimedia Object Authentication

Figure 3:
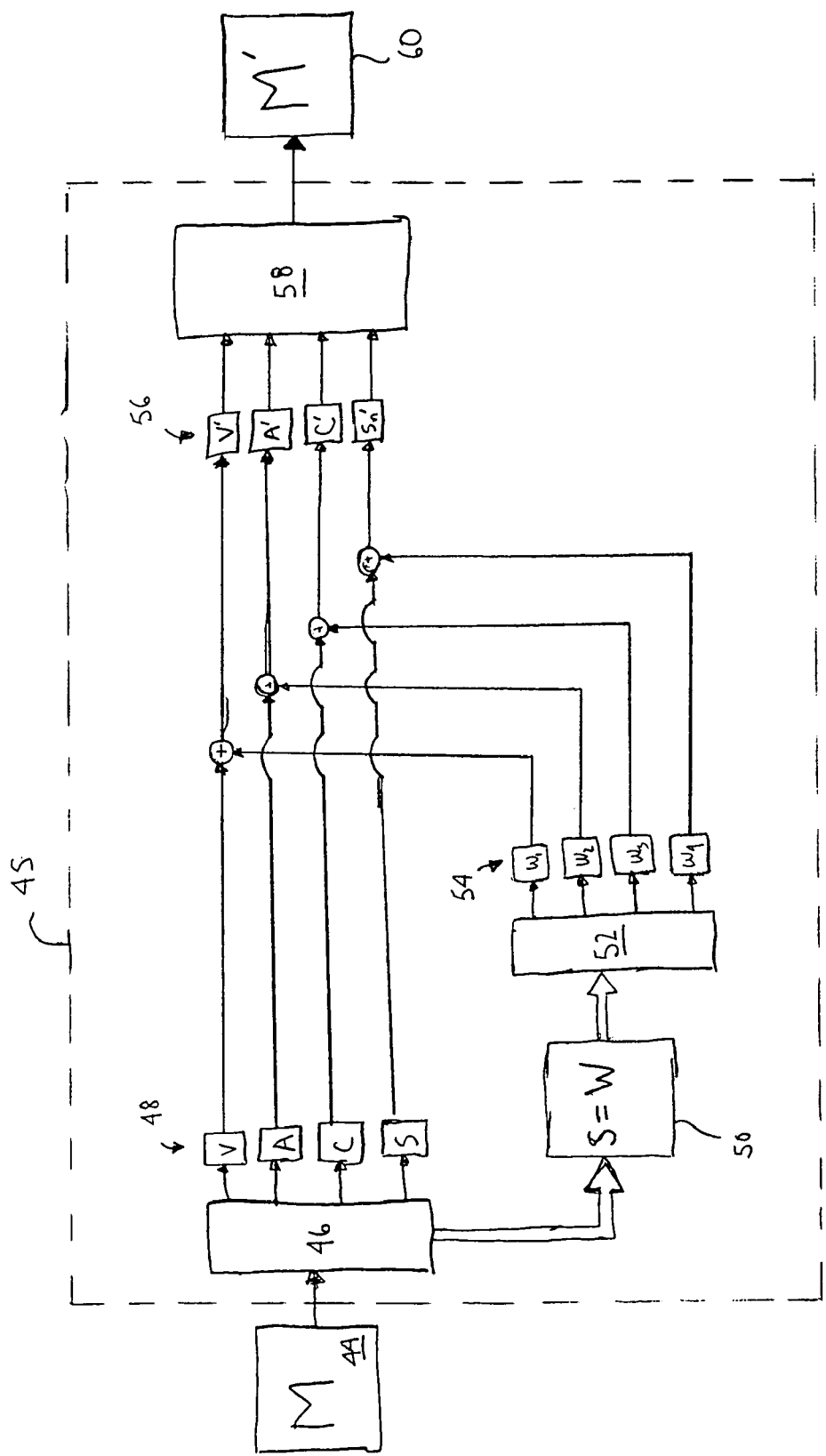
FIG. 3 describes a second embodiment of a system for watermarking a multimedia object in accordance with the invention.

Referring now to FIG. 3, a watermark insertion system 45 used for authenticating purposes is shown, which converts multimedia object 44 into a watermarked multimedia object 60. Similar to the embodiment depicted in FIG. 1, system 45 includes a device 46 for extracting the individual media components 48 that make up multimedia object 44. Device 46 further includes a mechanism for extracting a signature 50 of the multimedia object 44. While device 46 is shown in a single functional block, it understood that the system for extracting a signature may be functionally separated from the system that extracts the media components 48. Signature 50 contains data that is representative of the data contained in multimedia object 44. Many different ways of extracting the signature are known in the art. In this embodiment, the signature 50 is used as the watermark W. As an alternative, watermark W could be a function of the signature 50.

In a manner similar to the embodiment depicted in FIG. 1, the watermark is then split into a set of watermarked parts 54 by a splitting mechanism 52. Any predetermined formula for splitting the watermark W can be used. The individual watermarked parts 54 are then added to the media components 48 to provide a set of watermarked media components 56. The watermarked media components 56 are then combined using combining mechanism 58 to generate a watermarked multimedia object 60.

Referring now to FIG. 4, an authentication system 61 is depicted for authenticating a watermarked multimedia object 60 that includes independently watermarked media components, such as that created by system 45 shown in FIG. 3. System 61 includes a first device 62 for extracting each of the watermarked media components 64. A second device 66 is provided for extracting the watermarked parts 68 from each of the watermarked media components 64. In addition, device 66 extracts the signature of the received multimedia object, which acts as a signature watermark 74. It should be recognized that a separate device could be used to extract the signature of the watermarked multimedia object 60. Signature watermark 74 is extracted using the same formula that was used to create the original watermark inserted into multimedia object 60, as shown in FIG. 3.

The extracted watermark parts 68 are then combined with combining mechanism 70 to generate an extracted watermark 72. Combining mechanism 70 combines the watermark components 68 using the same ratio, formula or system as splitting mechanism 52, shown in FIG. 3, used to split them. The extracted watermark 72 is then compared with the signature watermark 74 using comparing mechanism 78. The result of the compare is then generated as output 80. If the two watermarks match within a degree of threshold, then the multimedia object 60 is authenticated. Conversely if the two watermarks 72 and 76 do not match, then it is known that the watermarked multimedia object 60 is no longer authentic.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

I claim:

1. A method of protecting a multimedia object having a first media component and a second media component, comprising the steps of:
   providing a watermark;
   splitting the watermark into a first part and a second part;
   inserting the first part of the watermark into the first media component;
   inserting the second part of the watermark into the second media component; and
   outputting a watermarked multimedia object.

2. The method of claim 1, comprising the further steps of:
   receiving the watermarked multimedia object;
   extracting from the first media component of the watermarked multimedia object a first extracted watermark part;
   extracting from the second media component of the watermarked multimedia object a second extracted watermark part;
   combining the first extracted watermark part with the second extracted watermark part; and
   comparing the combined first and second extracted watermark parts with the provided watermark to verify an ownership.

3. The method of claim 1, wherein the watermark is a signature watermark and is provided by:
   obtaining a signature of the multimedia object; and
   generating the signature watermark as a function of the signature.

4. The method of claim 3, comprising the further steps of:
   receiving the watermarked multimedia object;
   extracting from the first media component of the watermarked multimedia object a first extracted watermark part;
   extracting from the second media component of the watermarked multimedia object a second extracted watermark part;
   generating a combination watermark by combining the first extracted watermark part with the second extracted watermark part;
   generating a signature watermark that is a function of a signature extracted from the watermarked multimedia object; and
   comparing the combination watermark with the signature watermark to authenticate the multimedia object.

5. A computer program product for protecting a multimedia object having a first media component and a second media component, said product including instructions, within a computer-readable medium, executable by a processor to carry out acts comprising:
   splitting a watermark into a first and a second part;
   inserting the first part into the first media components, and inserting the second part into the second media component.

6. The product of claim 5, further comprising instructions executable by said processor to carry out acts comprising outputting a watermarked multimedia object, wherein the watermarked multimedia object includes the first media component having the first part of the watermark, and the second media component having the second part of the watermark.

7. The product of claim 5, wherein the first media component is an audio component, and the second media component is a video component.

8. The product of claim 6, further comprising instructions executable by said processor to carry out acts comprising:
   obtaining a signature from the multimedia object; and
   generating the watermark as a function of the signature.

9. The product of claim 6, further comprising instructions executable by said processor to carry out acts comprising:
   extracting a first extracted watermark part from the first media component in the watermarked multimedia object;
   extracting a second extracted watermark part from the second media component in the watermarked multimedia object;
   combining the first extracted watermark part with the second extracted watermark part; and
   comparing the combined first and second extracted watermark parts with the watermark.

10. The product of claim 8, further comprising instructions executable by said processor to carry out acts comprising:
    extracting a first extracted watermark part from the first media component in the watermarked multimedia object;
    extracting a second extracted watermark part from the second media component in the watermarked multimedia object;
    generating an extracted watermark by combining the first extracted watermark part with the second extracted watermark part;
    generating a signature watermark that is a function of a signature of the watermarked multimedia object; and
    comparing the extracted watermark with the signature watermark.

11. A computer program product for authenticating a watermarked multimedia object having a first media component and a second media component, said product including instructions, within a computer-readable medium, executable by a processor to carry out acts comprising:
    extracting a first watermark part from the first media component;
    extracting a second watermark part from the second media component;
    combining the first extracted watermark part with the second extracted watermark part; and
    comparing the combined first and second watermark parts with a provided watermark.

12. The product of claim 11, wherein the provided watermark is generated as a function of a signature of the watermarked multimedia object.

13. The product of claim 11, wherein the first media component is a video component and the second media component is an audio component.

14. The product of claim 13, wherein the watermarked multimedia object has a third media object, and wherein the third media object is a closed caption component.

15. A computer system comprising the product of claim 11.

16. A computer system comprising the product of claim 5.

* * * * *